(12) United States Patent
Olavarria

(10) Patent No.: US 6,740,348 B2
(45) Date of Patent: May 25, 2004

(54) PRESS-FORMED GRAIN SNACKS AND PROCESS THEREFOR

(75) Inventor: Santiago A. Olavarria, College Point, NY (US)

(73) Assignee: Stewart Krentzman, River Vale, NJ (US)

( * ) Notice: Subject to any disclaimer, the term of this patent is extended or adjusted under 35 U.S.C. 154(b) by 161 days.

(21) Appl. No.: 10/047,274

(22) Filed: Oct. 23, 2001

(65) Prior Publication Data

US 2003/0077375 A1 Apr. 24, 2003

(51) Int. Cl.[7] .............................. A23P 1/12; A23L 1/10
(52) U.S. Cl. ................ 426/461; 426/451; 426/456; 426/462; 426/502; 426/510; 426/514; 426/516; 426/808
(58) Field of Search ................ 426/448, 449, 426/451, 461, 462, 456, 441, 502, 514, 516, 808, 510

(56) References Cited

U.S. PATENT DOCUMENTS

| | | | | |
|---|---|---|---|---|
| 5,500,236 A | * | 3/1996 | Miller et al. | 426/451 |
| 5,599,573 A | * | 2/1997 | Barnes et al. | 426/451 |
| 6,432,457 B1 | * | 8/2002 | Jones | 426/656 |
| 6,558,718 B1 | * | 5/2003 | Evenson et al. | 426/72 |

OTHER PUBLICATIONS

Zukin, J. 1991, Dairy–Free Cookbook, Prima Publishing, Rocklin, CA 95677, p. 299.*

* cited by examiner

Primary Examiner—Helen Pratt
(74) Attorney, Agent, or Firm—Paul W. Garbo

(57) ABSTRACT

Grain-rich snacks are produced by forming a pasty mixture comprising grain and a minor proportion of egg white, press-forming the pasty mixture to yield formed snacks, and contacting the formed snacks with superheated steam to set the egg white as binder of the snacks. Press-forming can be conducted by press-molding the pasty mixture in mold cavities or by extrusion to form rods or ribbons that are cut into snack-size pieces. Grains such as grits, oatmeal, pasta and rice in a pasty mixture with egg white may include other foods such as ground meat, chopped nuts, maple syrup, etc.

26 Claims, 1 Drawing Sheet

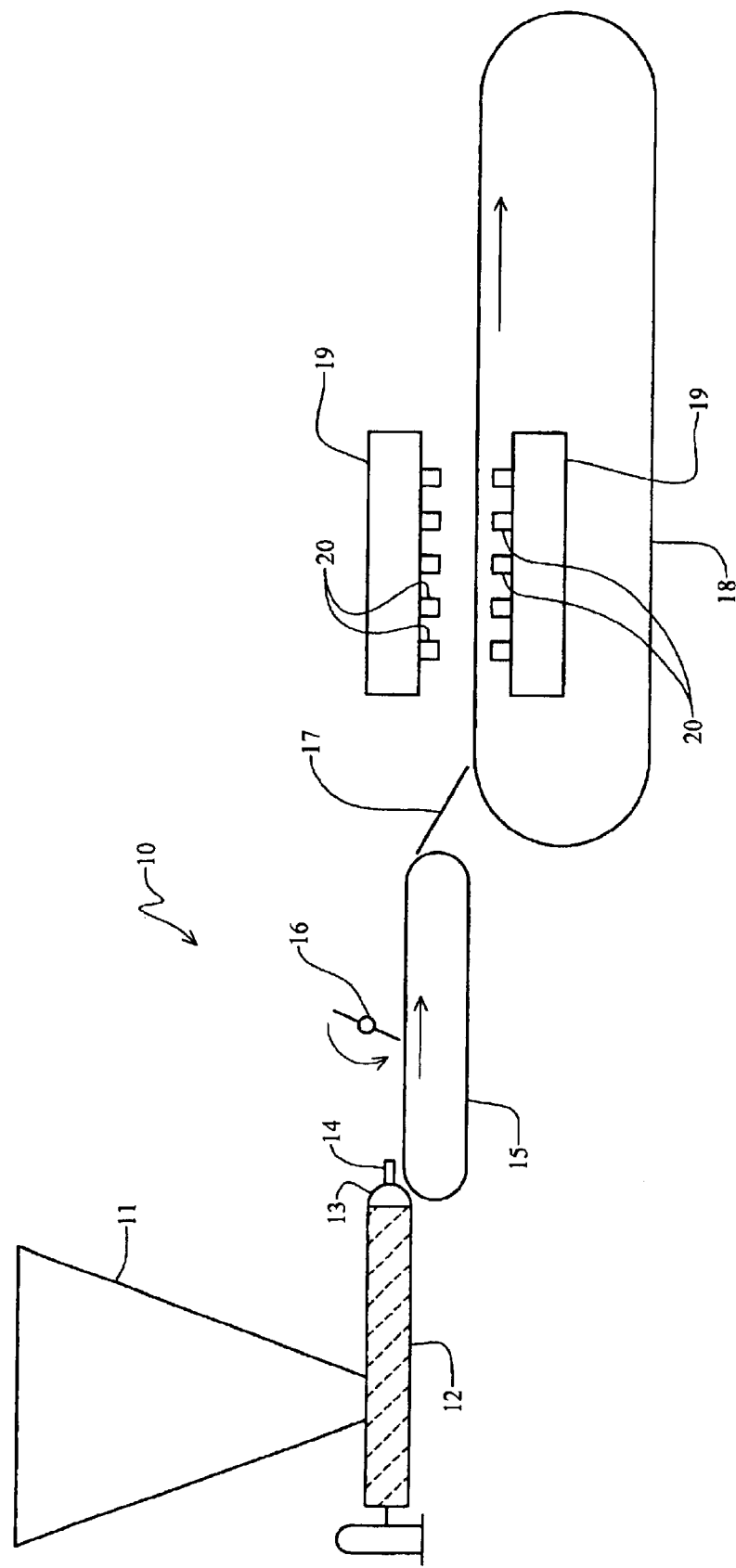

PRESS-FORMED GRAIN SNACKS AND PROCESS THEREFOR

BACKGROUND OF THE INVENTION

This invention relates to grain-rich snacks and a process for producing them. More particularly, the invention involves press-forming pasty mixtures of grains containing egg white as binding agent to produce snack-size pieces or units which are contacted with superheated steam to set the egg white.

Snack foods have found increasing popularity and the variety has also increased with time. Pretzels, nuggets, crackers and all sorts of chips are produced and sold in large quantities.

A principal object of this invention is to provide a different type of snacks formed of grains such as wheat, rye, oats and rice.

Another important object is to provide a simple and economic process for the mass production of grain snacks.

A further object is to provide a process based on well-known apparatus capable of continuous and trouble-free operation.

These and other features and advantages of the invention will be apparent from the description which follows.

SUMMARY OF THE INVENTION

In accordance with this invention, a grain, usually cooked as in boiling water, is mixed with liquid egg white (albumen) or egg white powder reconstituted in water, and with desired condiments, and the resulting dough-like or pasty mass is press-formed to produce desired snack shapes. Press-forming can be conducted either by pressing the pasty mass into molding cavities or by extrusion to form rods, thick ribbons, or other continuous shapes that are cut into snack pieces (usually about 2 to 4 inches in length). The snack pieces, formed of extruded material or by pressing in mold cavities, are next contacted with superheated steam usually at a temperature of at least about 300° C. The impingement of superheated steam immediately sets the egg white as a binder of the grain-rich, snack pieces, the surfaces of which are drier than the cores, and are not sticky. The use of superheated steam effects almost instant setting of egg white as binder and formation of skin-like, non-sticky surfaces. This advantageous feature of the invention makes it possible to dry the surfaces of the snack pieces so that they are not sticky to the touch yet the cores are desirably moist and soft in the mouth. This is an ideal combination of physical properties for snack products eaten with the fingers. The texture (feel in the mouth) of a snack is an important factor in gaining wide popularity.

For rapid and effective treatment with superheated steam, the temperature range of about 300° to 350° C. with a contact period of not more than about 2 minutes is preferred for most grain recipes. Longer contact with superheated steam at lower temperature, say 250° C., is not often used. Temperatures above 350° C. can adversely affect the taste and texture of snacks.

Inasmuch as grain snacks produced pursuant to this invention are usually made in large quantities for wide distribution, the use of superheated steam has the additional benefit of sterilizing the snacks before they are frozen and packaged for distribution.

When the frozen grain snacks are to be consumed, they are heated in any of several ways, e.g. in a conventional or microwave oven, or in hot oil or syrup.

The mass production of press-formed grain snacks pursuant to this invention is achieved with simple, conventional equipment designed for continuous operation requiring minimal worker attention. For extruded snacks, the basic components of the production system are an extruder with multiple extrusion ports, a common conveyor belt, cutting means to sever the extruded material on the conveyor belt into pieces of desired length, a reticular metal conveyor belt, and steam jets positioned on opposite sides of the upper run of the reticular conveyor. A freezer is frequently used for prompt preparation of the grain snacks for wide distribution.

Steam generated at any pressure is known as saturated water vapor and has a specific temperature at any selected pressure. Saturated water vapor or steam at any pressure, when isolated from water, can be heated to produce superheated steam. For example, steam generated at a gauge pressure of 60 pounds per square inch has a temperature of about 154° C., but can be heated (in the absence of water) to any higher temperature to yield superheated steam. Thus, 60-pound (gauge) steam (154° C.) heated to a temperature of 300° C. has 146° C. of superheat; heated to 350° C. the steam has 196° C. of superheat. High superheat is desirable to shorten the time of contact with the pasty press-formed snacks to set the albumen as a skin on the snacks and as internal binder without the snacks losing so much moisture as to feel "dried out" in the mouth. High superheat also avoids any condensation of water on the snacks.

The example of 60-pound steam has been selected because it is a practical pressure commonly used in commercial operations. Lower steam pressures as well as higher pressures can be used but higher pressures entail increased cost without compensating benefit.

For the purposes of this invention, superheated steam at a temperature in the range of about 300° C. to 350° C. is frequently preferred. For steam pressures ranging from 10-pounds to 100 pounds (gauge), the preferred temperature range will provide between about 130° C. and 235° C. of superheat for the desired setting of albumen in the snacks.

For press-molded snacks, a large selection of apparatus is available. For example, U.S. Pat. No. 3,964,127 to Holly shows a machine in which ground meat is pressure fed into a mold opening. U.S. Pat. No. 4,276,318 to Orlowski et al discloses another molding apparatus in which food is fed upwardly under pressure into several mold cavities. In the large-scale production of molded snacks pursuant to this invention, a molding apparatus is coupled with a reticular metal conveyor belt having steam jets positioned on opposite sides of the upper run of the reticular conveyor.

Of course, the molding apparatus is equipped with means for feeding comminuted food thereto, and a freezer usually completes the production system. On some systems, an additional process step, such as frying the snacks, may follow the step of contacting the snacks with superheated steam. Frying is desirable when the grain-rich snack includes comminuted potato, meat, fish, etc.

The proportioning of egg white to grain varies with the particular chosen grain and other ingredients such as cheese that are used in the formulation of a snack. Cheese, starch, sugar, and edible gums are often included in the grain recipes and help diminish the quantity of egg white used. In all cases, egg white is a necessary but only minor portion (less than 5% by weight) of the grain snack recipe which is easily established by simple trial and error tests.

BRIEF DESCRIPTION OF THE DRAWING

For further clarification of the invention, the following description will refer to the appended drawing which is a schematic flowsheet of the novel process.

DESCRIPTION OF PREFERRED EMBODIMENTS

The pressure-formation of snacks by extrusion is illustrated by flowsheet 10 depicting hopper 11 in which a grain snack recipe containing egg white is supplied. The grain recipe flows from hopper 11 into screw feeder 12 of extruder 13 which forces the grain recipe through several side-by-side extrusion ports 14. The several extruded ribbons of grain recipe fall on conveyor belt 15. Rotary cutter 16 positioned over belt 15 serves to cut the extruded ribbons into segments of desired length.

The segments then pass from conveyor 15 over chute plate 17 to conveyor 18. The belt of conveyor 15 is preferably smooth and imperforate to provide a firm surface against which each radial blade of rotary cutter 16 can press to sever the ribbons of extruded grain into snack-size segments. By contrast, the belt of conveyor 18 is reticular or net-like, formed of metal, usually stainless steel.

A pair of superheated steam chests 19 are positioned on opposite sides of the top run of conveyor belt 18. Each chest 19 has multiple jets 20 aimed at belt 18. Chests 19 are preferably opposite one another so that their jets 20 simultaneously blast the tops and bottoms of the snack segments with superheated steam to effect setting of egg white as skin and binder of the grain snacks.

As the snack segments leave the zone of superheated steam chests 19, they are cooled, usually by blowing cool air (not shown) against them. The cooled segments are then frozen by any known method such as spraying with liquid carbon dioxide or nitrogen.

The alternate method of press-forming snacks by molding pursuant to this invention is illustrated by a simple modification of the flowsheet. In lieu of extruder 13 with extrusion ports 14, screw feeder 12 forces the pasty grain recipe into a patty-forming machine, such as that of the Orlowski et al patent which has several mold cavities. The patty-shaped snacks thus formed drop on conveyor 15 (rotary cutter is eliminated) and are transferred via chute plate 17 to reticular conveyor 18 for treatment with superheated steam from jets 20.

The frozen grain snacks are packaged for distribution to all sorts of food outlets including restaurants and supermarkets. When they are to be served, the frozen snacks are heated in a conventional or microwave oven, or by immersion in hot liquid such as oil or syrup. A few examples of grain snacks produced pursuant to this invention will illustrate the wide variety attainable, such as grits snacks for breakfast, sweet oatmeal snacks for children, and macaroni snacks served with cocktails.

EXAMPLE 1

Cooked grits are mixed with egg white and other ingredients in weight proportions as tabulated:

| | |
|---|---|
| cooked grits | 600 |
| egg white | 50 |
| starch | 30 |
| corn flour | 100 |
| water | 30 |
| butter | 15 |
| flavor | 0.7 |

The well mixed recipe is extruded as cylindrical ropes (0.6 inch diameter) which are cut into three-inch segments that are blasted with superheated steam at a temperature of 320° C. for a minute. The resulting product is frozen as previously discussed. When this frozen grits snack is to be served, it is heated and butter or maple syrup is added.

EXAMPLE 2

A children's oatmeal snack has the following formulation in weight parts:

| | |
|---|---|
| cooked oatmeal admixed with a minor portion of grits | 950 |
| brown sugar | 150 |
| corn flour | 100 |
| margarine | 50 |
| egg white | 40 |
| maple syrup | 75 |
| water | 50 |

This well mixed recipe is extruded as ribbons (1 inch wide, 0.25 thick) which are cut diagonally (30 degrees). After treatment with superheated steam at 340° C. the sweet snack is frozen for distribution, especially to fast food restaurants where the thawed snack can be eaten without any addition or further treatment.

EXAMPLE 3

A cocktail type of snack based on cooked macaroni has the following recipe in weight parts:

| | |
|---|---|
| cooked macaroni (tiny bowties) | 500 |
| cheese sauce including minor portions of whey, starch and water | 250 |
| flour mixture of durum and wheat with added starch and soy protein | 225 |
| egg white | 40 |
| sugar | 10 |

The mixture is extruded through elliptical ports (0.8 inch by 0.6 inch) and cut into three inch segments. After treatment with superheated steam at 340° C. for 2 minutes, these snack segments are cooled, frozen and packaged for distribution.

Oven heating is all that is required to make this macaroni snack ready for eating. It may be served with a dip such as salsa.

The variety of extruded grain snacks is indeed broad in view of the variety of grains ranging from breakfast cereals to rice and pasta, and in further view of added ingredients such as corn kernels, raisins, spices and flavorings. All such grain formulations include egg white as binding agent that on exposure to superheated steam makes the extruded mass coherent and its exposed surface like a non-sticky skin.

Variations and modifications of the invention will be apparent to those skilled in the art without departing from the spirit or scope of the invention. For example, a minor proportion of chopped nuts may be added to the recipe of Example 2, and grilled ground beef to Example 3.

Accordingly, only such limitations should be imposed on the invention as are set forth in the appended claims.

What is claimed is:

1. Grain-rich snacks comprising grain and a minor proportion of egg white, and formed by press-forming a pasty mixture of said grain and egg white and by contacting the press-formed snacks with superheated steam to set said egg white as binder of said snacks.

2. The grain-rich snacks of claim 1 wherein the grain is cooked and is selected from the group consisting of grits, oatmeal, pasta and rice.

3. The grain-rich snacks of claim 2 wherein the press-forming of the pasty mixture is conducted by press-molding.

4. The grain-rich snacks of claim 1 wherein the pasty mixture of grain includes starch and/or flour.

5. The grain-rich snacks of claim 1 wherein the press-forming of the pasty mixture is conducted by extrusion thereof as a rope or ribbon that is cut into said snacks.

6. The grain-rich snacks of claim 5 wherein the grain is cooked and is selected from the group consisting of grits, oatmeal, pasta and rice.

7. The grain-rich snacks of claim 6 wherein the pasty mixture includes starch and/or flour.

8. A process of producing grain-rich snacks, which comprises forming a pasty mixture comprising grain and a minor proportion of egg white, press-forming said pasty mixture to yield formed snacks and contacting said formed snacks with superheated steam to set said egg white as binder of said snacks.

9. The process of claim 8 wherein the superheated steam is at a temperature in the range of about 300° to 350° C.

10. The process of claim 9 wherein the grain is cooked and is selected from the group consisting of grits, oatmeal, pasta and rice.

11. The process of claim 10 wherein the contact of superheated steam with the formed snacks is not longer than about 2 minutes.

12. The process of claim 8 wherein contacting the formed snacks with superheated steam is conducted by moving said formed snacks on a metal reticular conveyor belt while opposed jets of said steam impinge on said formed snacks from above and below said belt.

13. The process of claim 12 wherein the grain is cooked and is selected from the group consisting of grits, oatmeal, pasta and rice.

14. The process of claim 13 wherein the superheated steam is at a temperature in the range of about 300° to 350° C. and is applied for not more than about 2 minutes.

15. The process of claim 13 wherein the snacks after being contacted with superheated steam are frozen by spraying with liquid carbon dioxide or nitrogen.

16. The process of claim 12 wherein the grain is cooked and is selected from the group consisting of grits, oatmeal, pasta and rice, and the press-forming of the pasty mixture is conducted by extrusion thereof as a rope or ribbon that is cut into said snacks.

17. The process of claim 16 wherein the superheated steam is at a temperature in the range of about 300° to 350° C., and contacts the formed snacks for not more than about 2 minutes.

18. The process of claim 17 wherein the snacks after being contacted with superheated steam are frozen by spraying with liquid carbon dioxide or nitrogen.

19. The process of claim 12 wherein the grain is cooked and is selected from the group consisting of grits, oatmeal, pasta and rice, and the press-forming of the pasty mixture is conducted by press-molding said mixture.

20. The process of claim 19 wherein the superheated steam is at a temperature in the range of about 300° to 350° C. and contacts the formed snacks for not more than about 2 minutes.

21. A process of producing grain-rich snacks, which comprises forming a pasty mixture comprising a cooked grain selected from the group consisting of grits, oatmeal, pasta and rice, and a minor proportion of egg white, press-forming said pasty mixture to yield formed snacks, and contacting said formed snacks with superheated steam to set said egg white as binder of said snacks.

22. The process of claim 21 wherein contacting the formed snacks with superheated steam is conducted by moving said formed snacks on a metal reticular conveyor belt while opposed jets of said steam impinge on said formed snacks from above and below said belt.

23. The process of claim 21 wherein the press-forming of the pasty mixture is conducted by extrusion thereof as a rope or ribbon that is cut into said snacks.

24. The process of claim 21 wherein the snacks after being contacted with superheated steam are frozen by spraying with liquid carbon dioxide or nitrogen.

25. The grain-rich snacks prepared by the process of claim 21.

26. The grain-rich snacks prepared by the process of claim 24.

* * * * *